US009196228B2

(12) United States Patent
Kim

(10) Patent No.: US 9,196,228 B2
(45) Date of Patent: Nov. 24, 2015

(54) IMAGE DISPLAYING APPARATUS AND IMAGE DISPLAYING METHOD

(75) Inventor: Jung-dae Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1101 days.

(21) Appl. No.: 12/688,267

(22) Filed: Jan. 15, 2010

(65) Prior Publication Data

US 2011/0001759 A1 Jan. 6, 2011

(30) Foreign Application Priority Data

Jul. 1, 2009 (KR) .......................... 10-2009-0059886

(51) Int. Cl.

| G09G 5/00 | (2006.01) |
|---|---|
| G09G 5/391 | (2006.01) |
| H04N 7/12 | (2006.01) |
| H04N 7/01 | (2006.01) |
| G06F 3/041 | (2006.01) |
| H04N 21/431 | (2011.01) |

(Continued)

(52) U.S. Cl.
CPC .............. *G09G 5/391* (2013.01); *G06F 3/0412* (2013.01); *H04N 7/0122* (2013.01); *H04N 7/122* (2013.01); *H04N 21/4318* (2013.01); *H04N 21/4325* (2013.01); *H04N 21/440263* (2013.01); *G09G 5/005* (2013.01); *G09G 2340/0442* (2013.01)

(58) Field of Classification Search
CPC . G06F 3/0485; G06F 3/0213; G06F 3/04845; G06F 17/212; G06F 3/0481; G06F 2203/04806; G09G 5/34; G09G 2340/0407; G06T 3/4038

USPC ......... 345/660, 661, 667, 634, 671, 173, 684, 345/619; 348/36; 382/298, 284; 352/86; 715/732, 247, 764, 784–785, 864, 264

See application file for complete search history.

(56) References Cited

U.S. PATENT DOCUMENTS

| 5,883,619 A | 3/1999 | Ho et al. |
| 6,549,681 B1 * | 4/2003 | Takahashi et al. ............ 382/284 |

(Continued)

FOREIGN PATENT DOCUMENTS

| EP | 0979008 A2 | 2/2000 |
| EP | 1770988 A2 | 4/2007 |

(Continued)

OTHER PUBLICATIONS

European Search Report issued Sep. 5, 2011 in corresponding European Patent Application No. 10150969.3.

(Continued)

*Primary Examiner* — Chante Harrison
(74) *Attorney, Agent, or Firm* — Sughrue Mion, PLLC

(57) ABSTRACT

An image displaying apparatus is provided, which includes: a display unit that displays an image, and which has a horizontal width and a vertical width; an image processing unit which processes the image; and a controller which controls the image processing unit, if an aspect ratio of the image is different from an aspect ratio of the display unit, to extend the image in a first direction until a horizontal width or a vertical width of the image becomes identical to any one of the horizontal width and the vertical width of the display unit, to extend the image in a second direction to maintain the aspect ratio of the image, and to move the extended image in the second direction on the display unit.

44 Claims, 10 Drawing Sheets

(51) Int. Cl.
*H04N 21/432* (2011.01)
*H04N 21/4402* (2011.01)

(56) References Cited

U.S. PATENT DOCUMENTS

| | | | |
|---|---|---|---|
| 6,891,553 B2 | 5/2005 | White et al. | |
| 7,350,155 B2 | 3/2008 | White et al. | |
| 7,557,819 B2 | 7/2009 | Cole et al. | |
| 8,022,961 B2 * | 9/2011 | Sanno | 345/660 |
| 8,199,125 B2 * | 6/2012 | Misawa et al. | 345/173 |
| 8,218,895 B1 * | 7/2012 | Gleicher et al. | 345/667 |
| 8,237,712 B2 | 8/2012 | Fagans | |
| 2003/0035482 A1 * | 2/2003 | Klompenhouwer et al. | 348/36 |
| 2006/0002687 A1 | 1/2006 | Thrall et al. | |
| 2006/0156254 A1 | 7/2006 | Satake | |
| 2006/0177132 A1 | 8/2006 | Jackson | |
| 2006/0203199 A1 * | 9/2006 | Shah et al. | 352/86 |
| 2007/0085794 A1 | 4/2007 | Kawabe et al. | |
| 2007/0147708 A1 * | 6/2007 | Lee | 382/298 |
| 2008/0313210 A1 * | 12/2008 | Cooperstein et al. | 707/102 |
| 2009/0113307 A1 * | 4/2009 | MacKenzie | 715/732 |
| 2009/0268987 A1 | 10/2009 | Tsuda et al. | |
| 2009/0295789 A1 | 12/2009 | Yao et al. | |
| 2010/0060665 A1 * | 3/2010 | Wang et al. | 345/660 |
| 2010/0111429 A1 * | 5/2010 | Wang et al. | 382/233 |
| 2010/0141686 A1 * | 6/2010 | Ohdachi et al. | 345/667 |
| 2010/0199214 A1 * | 8/2010 | Mikawa | 345/661 |
| 2010/0235753 A1 * | 9/2010 | Sylthe et al. | 345/660 |
| 2010/0328352 A1 * | 12/2010 | Shamir et al. | 345/661 |
| 2011/0141229 A1 * | 6/2011 | Stec et al. | 348/37 |
| 2011/0234640 A1 * | 9/2011 | Ishida | 345/671 |
| 2012/0019563 A1 * | 1/2012 | Misawa et al. | 345/661 |
| 2012/0019614 A1 * | 1/2012 | Murray et al. | 348/36 |
| 2012/0154442 A1 * | 6/2012 | Takaoka et al. | 345/634 |

FOREIGN PATENT DOCUMENTS

| | | | |
|---|---|---|---|
| GB | 2369260 A | 5/2002 | |
| KR | 2001-0002767 A | 1/2001 | |
| KR | 10-2004-0068635 A | 8/2004 | |
| KR | 10-2004-0081332 A | 9/2004 | |
| KR | 10-0816916 B1 | 3/2008 | |
| KR | 10-2008-0086101 A | 9/2008 | |
| WO | 2008020506 A1 | 2/2008 | |

OTHER PUBLICATIONS

Communication dated Sep. 25, 2012 issued by the European Patent Office in counterpart European Application No. 10150969.3.
Communication dated Jul. 17, 2013 issued by the European Patent Office in counterpart European Patent Application No. 13161792.0.
Communication dated Aug. 6, 2013 issued by the European Patent Office in counterpart European Patent Application No. 10 150 969.3.
Edward, et al., "iPhone for Dummies, 3rd ed", Jan. 1, 2009, 2 pgs. Total (pp. 8, 126), XP002638168.
Apple, "iPod touch User Guide for iPhone OS 3.0 Software", Apple user guides, Jun. 1, 2009, pgs. 1-153, XP055019970.
Communication, dated Oct. 25, 2013, issued by the Korean Intellectual Property Office in counterpart Korean Patent Application No. 10-2009-0059886.
US Non-Final Office Action, dated Nov. 22, 2013, issued by the USPTO in related U.S. Appl. No. 14/026,578.
Communication dated May 27, 2014 issued by the United States Patent and Trademark Office in counterpart U.S. Appl. No. 14/026,578.
Communication, dated Feb. 27, 2014, issued by the European Patent Office in counterpart European Application No. 13 161 792.0.
Communication, dated Mar. 4, 2014, issued by the Korean Intellectual Property Office in counterpart Korean Application No. 10-2009-0059886.
Communication, dated Mar. 19, 2014, issued by the European Patent Office in counterpart European Application No. 10150969.3.
Communication dated Jan. 15, 2015 issued by the Korean Intellectual Property Office in counterpart Korean Application No. 10-2013-162888.
Communication from the European Patent Office issued Nov. 21, 2014, in a counterpart European Application No. 10150969.3.
Communication dated May 12, 2015, issued by the European Patent Office in counterpart European Application No. 15153492.2.

* cited by examiner

IMAGE DISPLAYING APPARATUS AND IMAGE DISPLAYING METHOD

CROSS-REFERENCE TO RELATED APPLICATIONS

This application claims priority from Korean Patent Application No. 10-2009-0059886, filed on Jul. 1, 2009, in the Korean Intellectual Property Office, the disclosure of which is incorporated by reference in its entirety.

BACKGROUND

1. Field

Apparatuses and methods consistent with the inventive concept relate to an image displaying apparatus and an image displaying method.

2. Description of the Related Art

When an external image is input, a display apparatus converts a format of the input image to be displayable thereon by adjusting a resolution, a size, etc. of the image. Generally, the display apparatus can adjust the resolution and the size of the image adaptively to its inherent resolution.

If the aspect ratio of the input image is not identical to that of the display apparatus, the image may be further contracted or extended in a specific direction. In this case, the original image may be distorted. Otherwise, as the image is displayed on some area of a display part, without fully utilizing the whole area of the display part, an empty space may be generated thereon.

SUMMARY

Accordingly, one or more exemplary embodiments may provide an image displaying apparatus and an image displaying method, capable of displaying a natural image without loss or distortion.

One or more exemplary embodiments may also provide an image displaying apparatus and an image displaying method, capable of displaying an image utilizing scrolling and sliding effects.

One or more exemplary embodiments may further provide an image displaying apparatus and an image displaying method, capable of processing a boundary of images to be natural.

One or more exemplary embodiments provides an image displaying apparatus including: a display unit which has a horizontal width and a vertical width; an image receiving unit which receives an image from an image source; an image processing unit which processes the image; and a controller which controls the image processing unit to extend the image until the horizontal width or the vertical width of the received image becomes identical to any one of the horizontal width and the vertical width of the display unit, with maintaining the aspect ratio of the image and to move the extended image to the other width direction of the display unit if an aspect ratio of the image is different from an aspect ratio of the display unit.

The display unit may be rectangular in shape.

If the ratio of the horizontal width to the vertical width of the image is smaller than the ratio of the horizontal width to the vertical width of the display unit, the image processing unit may extend the image until the horizontal width of the image becomes identical to the horizontal width of the display unit. The image may also be moved up and down.

If the ratio of the horizontal width to the vertical width of the image is larger than the ratio of the horizontal width to the vertical width of the display unit, the image processing unit may extend the image until the vertical width of the image becomes identical to the vertical width of the display unit. The image may also be moved left and right.

The controller may control the image processing unit to display a zoom in process whereby the image is extended before movement, and a zoom out process whereby the image is contracted after movement.

If a plurality of images are received from the image source, the controller controls the image processing unit to make boundaries among the plurality of images blurry.

The image displaying apparatus may further include a user selection unit for selecting a movement direction of the image therethrough.

The image displaying apparatus may further include a user selection unit for capturing therethrough an image being displayed while the image is being moved, wherein if an image is captured through the user selection unit, the controller stores the captured image.

One or more exemplary embodiments provide an image displaying apparatus, including: a display unit which has a horizontal width and a vertical width; an image processing unit which processes a plurality of images; and a controller which controls the image processing unit to adjust the plurality of images to make the horizontal width or the vertical width of a received image identical to any one of the horizontal width and the vertical width of the display unit, to connect the boundaries of the adjusted plural images, and to move the connected plural images to the other width direction of the display unit.

The controller may control the image processing unit to make boundaries between the plurality of images blurry.

One or more exemplary embodiments provide an image displaying method of an image displaying apparatus including a display unit having a horizontal width and a vertical width, including: receiving an image from an image source; extending the image to make the horizontal width or the vertical width of the received image identical to any one of the horizontal width or the vertical width of the display unit, with maintaining the aspect ratio of the image, if an aspect ratio of the image is different from an aspect ratio of the display unit; and moving the extended image to the other width direction of the display unit.

The image may be extended to make the horizontal width of the image identical to the horizontal width of the display unit if a ratio of the horizontal width to the vertical width of the image is smaller than a ratio of the horizontal path to the vertical path of the display unit. The image may also be moved in a vertical direction.

The image may be extended to make the vertical width of the image identical to the vertical width of the display if a ratio of the horizontal width to the vertical width of the image is larger than a ratio of the horizontal path to the vertical path of the display unit. The image may also be moved from in a horizontal direction.

The image displaying method may further include displaying a zoom in process to extend the image before movement and displaying a zoom out process to reduce the image after movement.

The image displaying method may further include processing the image to make boundaries between a plurality of images blurry if the plurality of images are received from the image source.

The image displaying method may further include receiving a user selection signal to capture the image being displayed during movement of the image; and storing the captured image.

BRIEF DESCRIPTION OF THE DRAWINGS

The above exemplary embodiments and/or utilities of the inventive concept will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
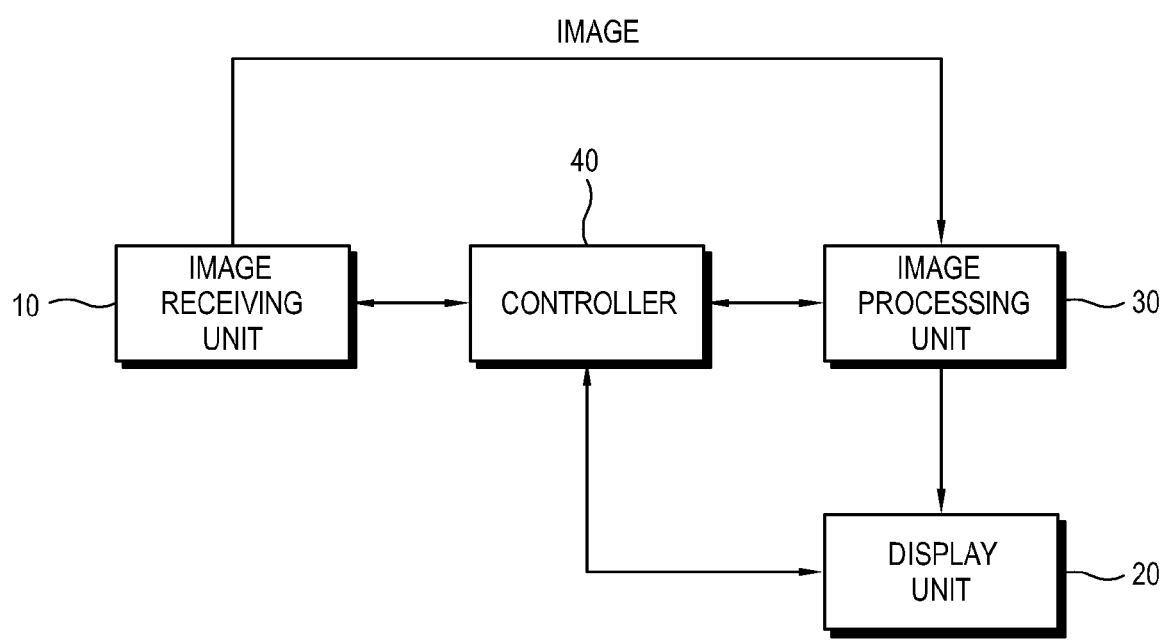
FIG. 1 is a control block diagram of an image displaying apparatus according to an exemplary embodiment.

Hereinbelow, exemplary embodiments will be described in detail with reference to the accompanying drawings, in such a manner that the persons having ordinary knowledge in the art to which the exemplary embodiments pertain can easily practice it. The present inventive concept can be embodied with several different configurations, and thus, the scope of the inventive concept will not be limited to the exemplary embodiments herein described. To describe the inventive concept in a clear manner, those portions having nothing to do with the description of the inventive concept will not be describe herein, and like reference numerals refer to the like or similar elements throughout.

FIG. 1 is a control block diagram of an image displaying apparatus according to an exemplary embodiment.

As illustrated in FIG. 1, an image displaying apparatus includes an image receiving unit 10, a display unit 20, an image processing unit 30 and a controller 40 controlling them. The displaying apparatus may be all electronic devices that can display images, e.g., a digital photo frame, and a compact display device such as a portable terminal, etc.

The image receiving unit 10 may include a connection part to which a storage medium such as a universal serial bus (USB) or a camera storing photos therein can be connected, and an interface connectable to the network or a broadcast receiving unit that can receive a broadcasting signal. For example, the image receiving unit 10 may be embodied by Bluetooth, an infrared ray communication, and a wire/wireless USB communication interface, etc. An image received by the image receiving unit 10 has an aspect ratio generally referred to as "a screen ratio." For example, a camera has a variety of aspect ratios such as 4:3, 16:9 and 6:6, and images having various aspect ratios can be generated through the camera. According to this exemplary embodiment, the image is preferably a stationary image such as a photo or a picture.

The display unit 20 displays thereon an image processed by the image processing unit 30. The display unit 20 may include a liquid crystal display (LCD) panel having liquid crystals, an organic light emitting diode (OLED) panel having organic light emitting devices or a plasma display panel (PDP), and a panel driving unit driving the panel. Generally, the display unit 20 is rectangular in shape, having a horizontal width and a vertical width. The ratio of horizontal width to vertical width, that is, aspect ratio may be 16:9 or 4:3. As the aspect ratio is determined when a displaying apparatus is manufactured, distortion of an input image may be generated if the aspect ratio of the input image is not identical to that of the display unit 20. If so, the image may be extended or contracted in a specific direction. Otherwise, it may be displayed on a partial area of the display unit, not on the whole area thereof. In other words, an empty space on which no image is displayed may occur.

The image processing unit 30 is controlled by controller 40 to process the received image and displays the image on the display unit. If the aspect ratio of the image is different from that of the display unit 20, the image processing unit 30 extends the image so that the horizontal width or the vertical width of the received image is identical to any one of the horizontal width and the vertical width of the display unit 20, while maintaining the aspect ratio of the image, and moves the extended image in the other width direction of the display unit 20.

Figure 2:
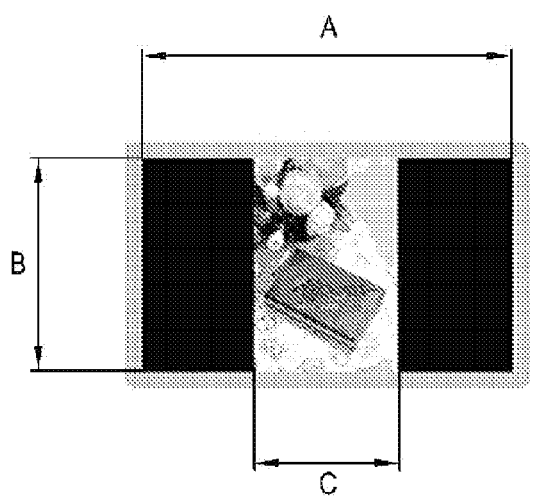
FIG. 2 is a view showing an image input into the image displaying apparatus of FIG. 1.
Figure 3:
FIG. 3 is a view showing a process of displaying the input image of FIG. 2.
Figure 4:
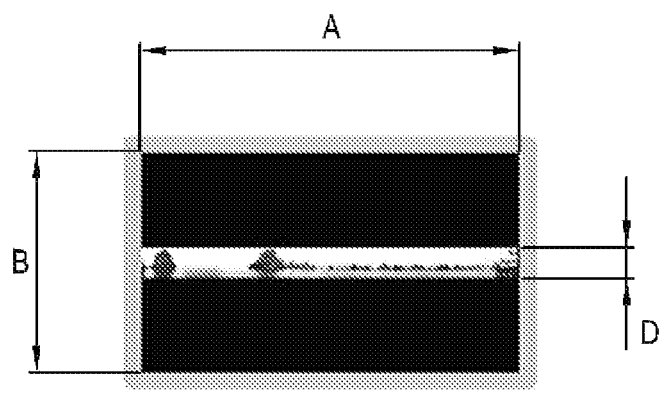
FIG. 4 is a view showing another image input into the image displaying apparatus of FIG. 1.

As described above, an image may have a variety of aspect ratios, and the aspect ratio of the display unit 20 is determined when the display apparatus is manufactured. Where the aspect ratio of the image and that of the display unit 20 are not identical, the image is displayed as illustrated in FIG. 2 or FIG. 4. FIG. 2 illustrates a case where the ratio C/B of the horizontal width C to the vertical width B of the image is smaller than the ratio A/B of the horizontal width A to the vertical width B of the display unit 20. In this case, black screens are displayed on the left and right area of the display unit 20. FIG. 4 illustrates a case where the ratio A/D of the horizontal width A to the vertical width D of the image is larger than the ratio A/B of the horizontal width A to the vertical width B of the display unit 20. In this case, black screens are displayed on the top and bottom area of the display unit 20.

Where the black screens are displayed in left and right areas of the display unit 20 as illustrated in FIG. 2, the image processing unit 30 extends the image until the horizontal width C of the image becomes identical to the horizontal width A of the display unit 20, while maintaining the aspect ratio of the image. As the horizontal width C of the image is extended by a multiple of A/C, while maintaining the aspect ratio of the image, the vertical width B of the image is also extended by a multiple of A/C, whereby the vertical width B of the image becomes A*B/C. As the image is extended, the entire image cannot be displayed on the display unit 20. The image processing unit 30 moves the extended image in a vertical direction of the image, as illustrated in FIG. 3; that is, scrolling the image downward. In other words, the horizontal width C of the image is extended to be identical to the horizontal width A of the display unit 20 and scrolled in the vertical direction B of the display unit 20. As the image is displayed and scrolled on the whole area of the display unit 20, no black screen is displayed on the display unit 20. Also, as the user can view a dynamic image rather than a stationary image, the user may have a relatively higher interest in appreciating the image.

Figure 5:
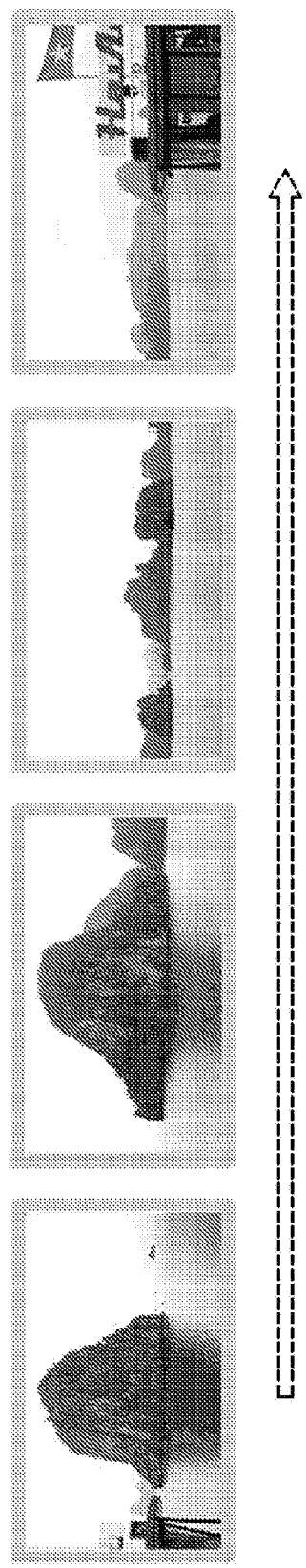
FIG. 5 is a view showing a process of displaying the input image of FIG. 4.

FIG. 5 shows an image that is extended and moved as illustrated in FIG. 4. Where black screens are displayed on the top and bottom area of the display unit 20, the image processing unit 30 extends the image so as to make the vertical width D of the image identical to the vertical width B of the display unit 20, while maintaining the aspect ratio of the image. As the vertical width B of the image is extended by a multiple of B/D, the horizontal width A of the image is also extended by a multiple of B/D, whereby the horizontal width A of the image becomes A*B/D. The image processing unit 30 moves the extended image in a horizontal direction of the image, that is, the image is moved left and right. The vertical width D of the image is extended to be identical to the vertical width D of the display unit 20 and is scrolled in the horizontal width direction A of the display unit 20.

Figure 6:
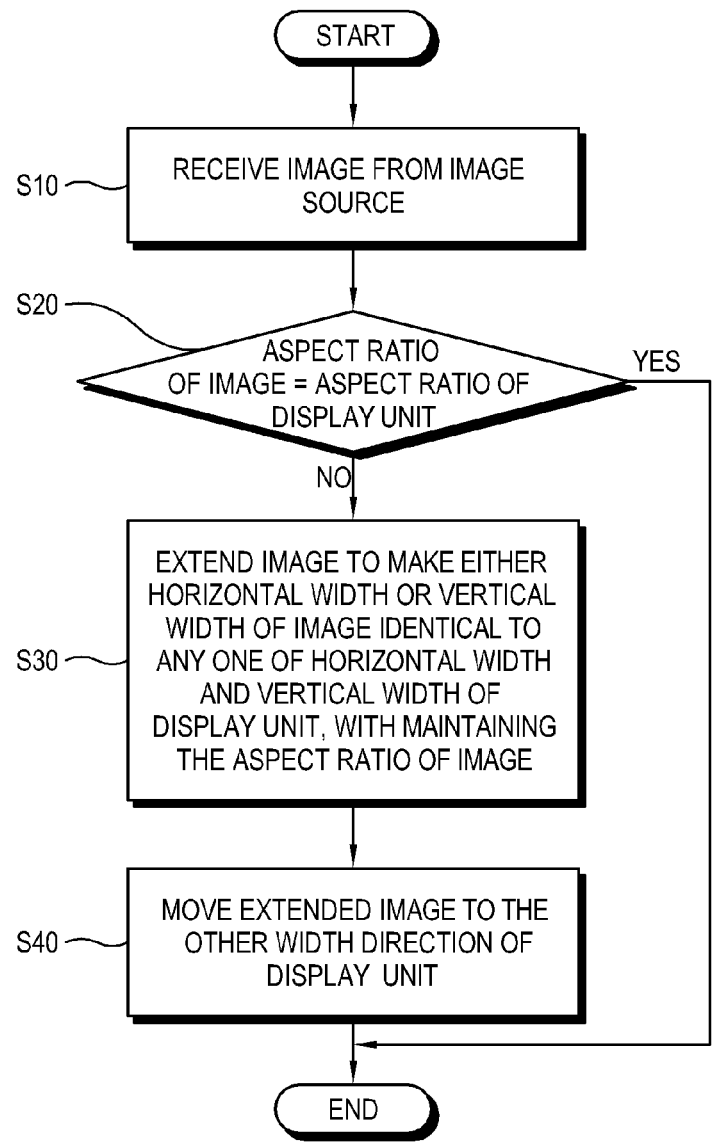
FIG. 6 is a control flowchart to explain a control method of the image displaying apparatus of FIG. 1.

FIG. 6 is a control block diagram explaining a control method of the image displaying apparatus of FIG. 1. Referring to FIG. 6, the image displaying method of the image displaying apparatus according to this exemplary embodiment will be described below.

The image displaying apparatus first receives an image from an image source through the image receiving unit 10 (S10).

The controller 40 determines whether the aspect ratio of the image is identical to that of the display unit 20 (S20).

If it is determined that the image has the identical aspect ratio to the display unit 20, the controller 40 controls the image processing unit 30 to scale the image according to the resolution of the display unit 20.

However, if it is determined that the aspect ratio of the image is not identical to that of the display unit 20, the image processing unit 30 extends the image so as to make the horizontal width or the vertical width of the received image identical to any one of the horizontal width and the vertical width of the display unit 20, while maintaining the aspect ratio of the image (S30).

If the ratio of the horizontal width to the vertical width of the image is smaller than the ratio of the horizontal width to the vertical width of the display unit 20, the horizontal width of the image is extended to be identical to the horizontal width of the display unit 20. If the ratio of the horizontal width to the vertical width of the image is larger than the ratio of the horizontal width to the vertical width of the display unit 20, the vertical width of the image is extended to be identical to the vertical width of the display unit 20.

Then, the image processing unit 30 moves the extended image in the other width direction of the display unit 20, i.e., the width portion of the display unit 20 not identical to a width of the image (S40). If the horizontal width of the image is identical to the horizontal width of the display unit 20, the image is moved up and down. If the vertical width of the image is identical to the vertical width of the display unit 20, the image is moved left and right.

Figure 7:
FIG. 7 is a view showing a process of displaying an input image according to another exemplary embodiment.

FIG. 7 illustrates a process of displaying an input image according to another exemplary embodiment. The controller 40 controls the image processing unit 30 to display a zoom in process (a) to extend the image before movement of the image and to display a zoom out process (b) to contract the image after movement of the image. Through these processes, the user can ascertain an original photo before it is extended. The time during which zoom in and zoom out processes are performed may be set by the user or may be set at a default value. For example, the extended image may be displayed for a very short period of time, like a pop-up after the original image is displayed, or the zoom in process may be displayed at a slow speed.

If a plurality of images are consecutively displayed, the images are displayed in the following sequence: After an original image is displayed, the extended image is moved, and the original image is again displayed after movement of the extended image. Then, the original image and the extended image of a next image are sequentially displayed.

Figure 8:
FIG. 8 is a view showing a process of displaying an input image according to a further exemplary embodiment.

FIG. 8 illustrates a process of displaying an input image according to another exemplary embodiment. When a plurality of images are received from an image source, the controller 40 controls the image processing unit 30 so that the plurality of images are displayed as if they are connected to each other. That is, with respect to a single image, a scrolling effect is given. In case of displaying such an image in plural, the images are displayed with a sliding effect. As illustrated in FIG. 8, a first image I and a second image II are connected to each other, and thus, the user can feel like the user is viewing camera film.

The image processing unit 30 according to this exemplary embodiment diffuses a boundary ⓑ of the images so as to make the boundary ⓑ between images unclear and blurry. The unclear boundary ⓑ is effective in allowing the images to naturally be linked, and the user can appreciate the images comfortably as though the images are not disconnected.

The image processing unit 30 slices and processes the extended image in the unit of frame according to the resolution of the display unit 20. For example, if the extended image is of two frames, with respect to the resolution of the display unit 20, the image processing unit 30 stores the two-frame image and displays it by moving it. Meanwhile, if the size of the extended image is not an integer multiple of a frame, the image processing unit 30 connects the current image and its next image, stores them as a single-frame image and moves it. In case of a compact and portable image displaying apparatus such as a digital photo frame, it is preferable to reduce the amount of data stored, due to a restriction on the storage space. For this, the image processing unit 30 processes and stores a portion on which the current image and the next image are connected as a single frame when storing the images in units of frames.

Figure 9:
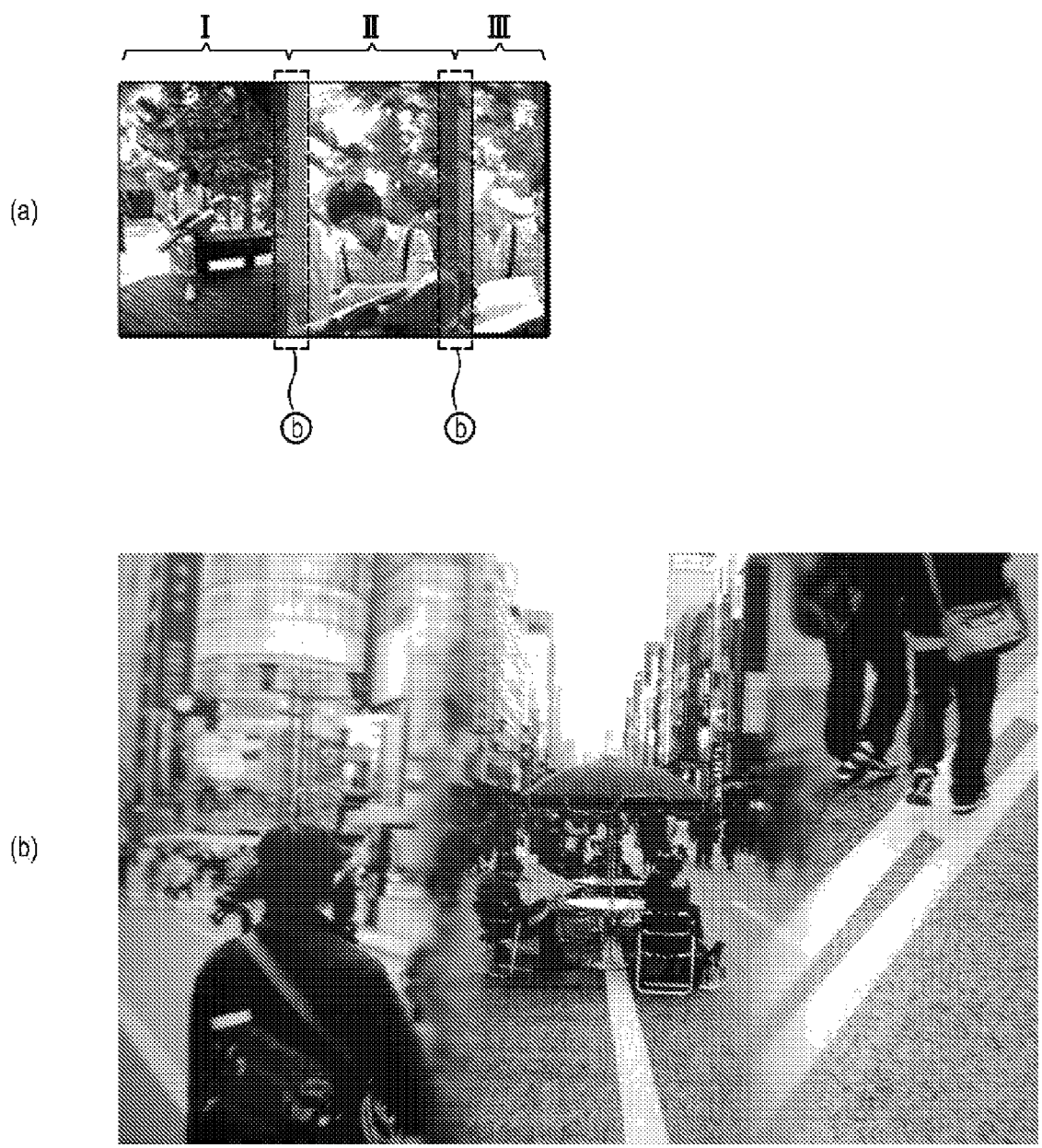
FIG. 9 is a view showing a process of displaying an input image according to a still further another exemplary embodiment.

FIG. 9 illustrates a process of displaying an input unit according a still another exemplary embodiment. The controller 40 controls the image processing unit 30 to adjust a plurality of images, so that the horizontal width or the vertical width of each image is identical to any one of the horizontal width and the vertical width of the display unit 20, connect the boundaries of the adjusted plural images, and move the connected plural images in the other width direction of the display unit 20. For example, a specific width direction of an image is adjusted, i.e., to make the vertical width of the display unit 20 identical to the vertical width of the image as shown in FIG. 9(a), and the plural images whose vertical widths are adjusted uniformly are connected with each other and moved to the horizontal width direction of the display unit 20. According to this exemplary embodiment, as the image is adjusted identically to a specific width direction of the display unit 20, while maintaining the aspect ratio thereof, the horizontal widths of the images are not uniform. As the plural images are moved in one direction, a panorama effect can be easily obtained. It is possible to move the image to the vertical width direction of the display unit 20 because the horizontal width of the image is adjusted to be identical to the horizontal width of the display unit 20.

Meanwhile, boundaries ⓑ between plural images I, II and III are diffused as shown in FIG. 9(a), resulting in displaying a natural image as shown in FIG. 9(b).

Figure 10:
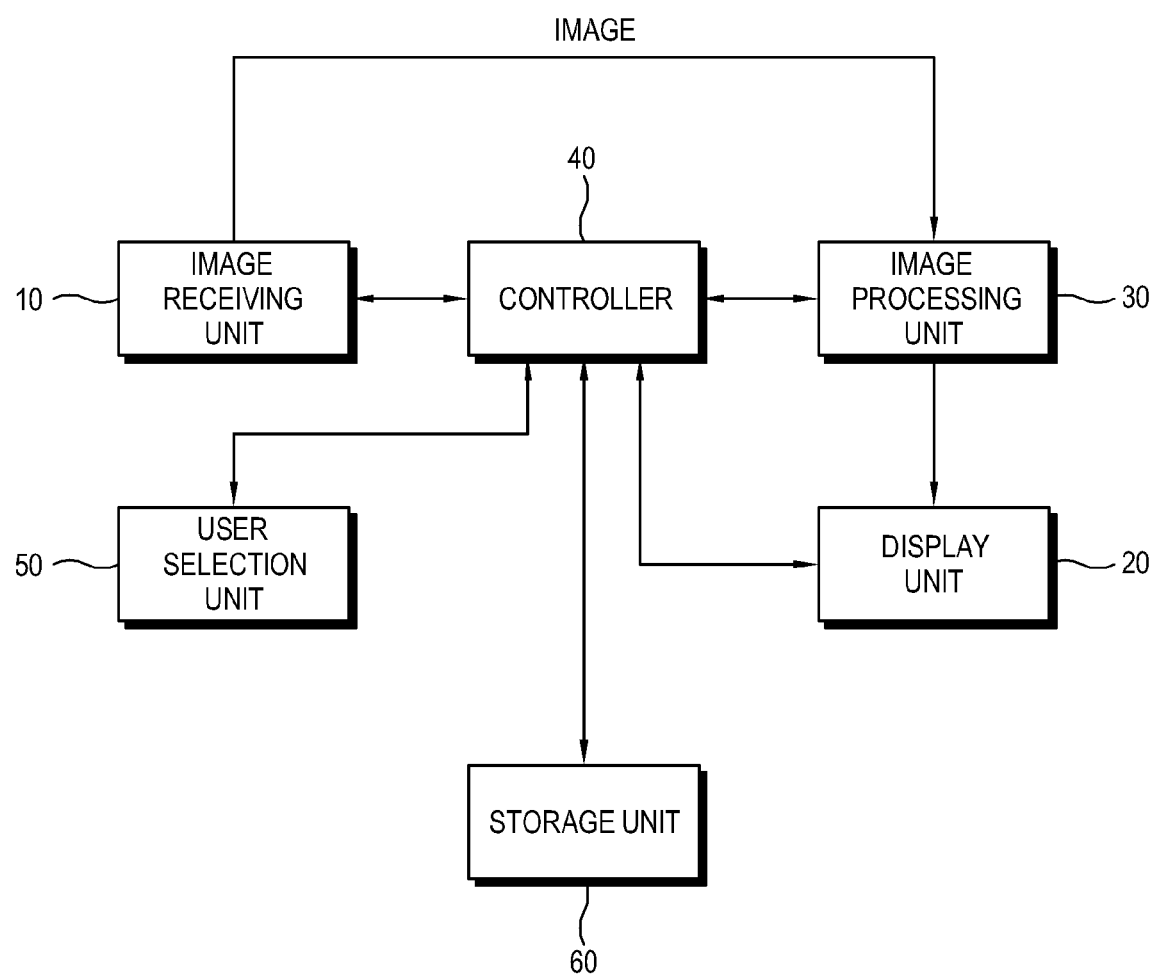
FIG. 10 is a control block diagram of an image displaying apparatus according to another exemplary embodiment.

FIG. 10 is a control block diagram of an image displaying apparatus according to a still another exemplary embodiment.

The image displaying apparatus includes a user selection unit 50 and a storage unit 60, in addition to the elements depicted in FIG. 1.

The user selection unit 50 enables a movement direction, i.e. a scrolling direction, of an image to be selected. For example, the user may move the extended image upward, downward, leftward or rightward. The movement direction of the image is not set at default. According to this exemplary embodiment, a user may select a movement direction of the image through the user selection unit 50. The user may also select a movement speed, a zoom in or a zoom out of the image through the user selection unit 50. The user selection unit 50 may be provided as an input device such as a keyboard, a mouse, a button or a remote control, etc. Preferably, the user selection unit 50 may include a touch panel coupled to the display unit 20. The touch panel may be externally disposed on the top of the display unit 20, or may be internally built in the display unit 20. Or, it may include a variety of configurations to sense a pressure applied by a user's finger or a pointing device.

The user may also capture an image while the images are being moved, through the user selection unit 50. When a specific portion is selected while the images are being slid, the controller 40 stores the specific portion of the selected image in the storage unit 60.

The storage unit 60 may be included in the controller 40, or may be provided as a separate memory device. The storage unit 60 may be internally built in the display apparatus, but may also be embodied as an external storage medium connected to the display apparatus.

According to another exemplary embodiment, the image may be internally stored, and not come from an image source connected with the image receiving unit 10. That is, the image processing unit 30 may receive and process images received from the image source, or process and display the images pre-stored by the user.

The exemplary embodiments process images having different aspect ratios from the aspect ratio of the display unit 20 with various methods. Any black screen on which no image is displayed is eliminated, and an animation effect is given, thereby enabling a user to appreciate the images with more interest.

Although a few exemplary embodiments of the inventive concept have been illustrated and described in details, the inventive concept shall not be limited thereto, and can be carried out in various manners, within the scope of the claims as described in the specification. The scope of this patent will be determined by the accompanying claims and equivalents thereof.

What is claimed is:

1. An image displaying apparatus, comprising:
a user input operable to receive a first user input to select a vertical image movement direction among an upward direction and a downward direction, and a second user input to select an image movement speed;
a display that displays an image; and
a controller which, if an aspect ratio of the image is different from an aspect ratio of a screen area of the display, is operable to control the display to resize the image so that a horizontal width of the image is resized to a predetermined size that fits within a horizontal width of the screen area while maintaining the aspect ratio of the image and to automatically move, at the selected image movement speed, a displayed portion of the resized image in the selected vertical image movement direction among the upward direction and the downward direction to enable a non-displayed portion of the image to become visible in the screen area,
wherein the controller controls the display to provide a defined boundary effect between the image and a subsequent image.

2. The image displaying apparatus of claim 1, further comprising a receiver which receives the image from an image source.

3. The image displaying apparatus of claim 1, further comprising a storage that stores the image.

4. The image displaying apparatus of claim 1, wherein the display is rectangular in shape.

5. The image displaying apparatus of claim 1, wherein if a ratio of the horizontal width to a vertical width of the image is smaller than a ratio of the horizontal width to a vertical width of the screen area, the controller controls the display to extend the image until the horizontal width of the image becomes identical to the horizontal width of the screen area.

6. The image displaying apparatus of claim 1, wherein if a ratio of the horizontal width to a vertical width of the image is larger than a ratio of the horizontal width to a vertical width of the screen area, the controller controls the display to extend the image until the vertical width of the image becomes identical to the vertical width of the screen area.

7. The image displaying apparatus of claim 1, wherein the controller controls the display to display a zoom in process on the screen area whereby the image is extended before movement, and a zoom out process whereby the image is contracted after movement.

8. The image displaying apparatus of claim 1, wherein the boundary effect comprises a blurry effect.

9. The image displaying apparatus of claim 1, wherein the user input receives a third user input to capture at least a portion of the image being displayed while the image is being moved,
wherein the controller stores the captured portion of the image.

10. The image displaying apparatus of claim 1, wherein the user input comprises a touch panel, and
the controller is configured to receive the first user input and the second user input via the touch panel.

11. The image displaying apparatus of claim 10, wherein the controller is configured to receive a user input via the touch panel to zoom in or zoom out the respective image displayed in the screen area.

12. The image displaying apparatus of claim 1, wherein the image is resized such that the horizontal width of the image equals an entire horizontal screen width of the screen area,
if the upward direction is selected via the first user input, the controller controls display of a next image sequentially in the screen area after a bottom edge portion of the image becomes visible, and
if the downward direction is selected via the first user input, the controller controls display of a next image sequentially in the screen area after a top edge portion of the image becomes visible.

13. The image displaying apparatus of claim 1, wherein, if the aspect ratio of the image is different from the aspect ratio of the screen area, the controller is operable to resize an image so that a vertical width of the image is resized to a predetermined size that fits within the vertical width of the screen area while maintaining the aspect ratio of the image and to move the resized image in the image movement direction.

14. The image displaying apparatus of claim 13, wherein the image is resized such that the vertical width of the image equals an entire vertical screen width of the screen area,
if a leftward image movement direction is selected via the user input, the controller controls display of a next image sequentially in the screen area after a right edge portion of the image becomes visible, and if a rightward image movement direction is selected via the user input, the controller controls display of a next image sequentially in the screen area after a left edge portion of the image becomes visible.

15. The image displaying apparatus of claim 1, wherein the controller automatically moves the displayed portion of the resized image without an additional interaction from a user.

16. The image displaying apparatus of claim 1, wherein the boundary effect comprises an effect to diffuse a boundary between the image and the subsequent image to make the boundary unclear or blurry.

17. The image displaying apparatus of claim 1, wherein the boundary effect comprises an animation effect between the image and the subsequent image.

18. An image displaying apparatus, comprising:
a display; and
a controller which controls the display to adjust a plurality of images in a first direction to make a horizontal width or a vertical width of an image identical to any one of a horizontal width and a vertical width of a screen area of the display, to connect boundaries of the adjusted plurality of images, and to automatically move the connected plural images in a second direction on the display,
wherein the controller controls the display to provide a defined boundary effect between the image and a subsequent image.

19. The image displaying apparatus of claim 18, wherein the boundary effect comprises a blurry effect.

20. The image displaying apparatus of claim 18, wherein the controller automatically moves the connected plural images in the second direction on the display without an additional interaction from a user.

21. The image displaying apparatus of claim 18, wherein the boundary effect comprises an effect to diffuse a boundary between the image and the subsequent image to make the boundary unclear or blurry.

22. The image displaying apparatus of claim 18, wherein the boundary effect comprises an animation effect between the image and the subsequent image.

23. A method of displaying a sequence of images on a display, the method comprising:
receiving a first user input to select a vertical image movement direction among an upward direction and a downward direction, and a second user input to select an image movement speed;
processing, by a processor, an image;
if an aspect ratio of the image is different from an aspect ratio of a screen area of the display, resizing the image to make a horizontal width thereof a predetermined size that fits within a horizontal width of the screen area, while maintaining the aspect ratio of the image;
automatically moving, by the processor, a displayed portion of the resized image in the selected vertical image movement direction among the upward direction and the downward direction at the selected image movement speed to enable a non-displayed portion of the image to become visible in the screen area; and
processing, by the processor, the image and a subsequent image for the display to provide a defined boundary effect between the image and the subsequent image.

24. The image displaying method of claim 23, wherein the extending the image extends the image to make the horizontal width of the image identical to the horizontal width of the screen area if a ratio of the horizontal width to a vertical width of the image is smaller than a ratio of the horizontal width to a vertical width of the screen area.

25. The image displaying method of claim 23, wherein the extending the image extends the image to make a vertical width of the image identical to a vertical width of the screen area if a ratio of the horizontal width to the vertical width of the image is larger than a ratio of the horizontal width to the vertical width of the screen area.

26. The image displaying method of claim 23, further comprising displaying a zoom in process to extend the image before movement and displaying a zoom out process to reduce the image after movement.

27. The image displaying method of claim 23, wherein the boundary effect comprises a blurry effect.

28. The image displaying method of claim 23, further comprising:
receiving a third user input to capture at least a portion of the image being displayed during movement of the image; and
storing the captured image.

29. The method of claim 23, further comprising:
if the upward direction is selected for the respective image via the first user input, displaying a next image sequentially on the screen area after a bottom edge portion of the respective image becomes visible; and
if the downward direction is selected for the respective image via the first user input, displaying a next image sequentially on the screen area after a top edge portion of the image becomes visible.

30. The method of claim 23, further comprising:
resizing an image so that a vertical width of the image is resized to a predetermined size that fits within a vertical width of the screen area while maintaining the aspect ratio of the image and to move the resized image in the image movement direction.

31. The method of claim 30, further comprising:
if a leftward image movement direction is set via a user input, displaying a next image sequentially on the screen area after a right edge portion of the image becomes visible; and
if a rightward image movement direction is set via a user input, displaying a next image sequentially on the screen area after a left edge portion of the image becomes visible.

32. The image displaying method of claim 23, wherein the automatically moving is performed without an additional interaction from a user.

33. The method of claim 23, wherein the boundary effect comprises an effect to diffuse a boundary between the image and the subsequent image to make the boundary unclear or blurry.

34. The method of claim 23, wherein the boundary effect comprises an animation effect between the image and the subsequent image.

35. An apparatus comprising:
a touch display configured to display an image, the touch display operable to receive a first user input to select a vertical image movement direction among an upward direction and a downward direction and a second user input to select an image movement speed; and
a controller which, if an aspect ratio of the image is different from an aspect ratio of a screen area of the touch display, is operable to control the touch display to resize the image so that a horizontal width of the image is resized to a predetermined size that fits within a horizontal width of the screen area while maintaining the aspect ratio of the image and to automatically move, at the selected image movement speed, a displayed portion of the resized image in the selected vertical image movement direction among the upward direction and the downward direction to enable a non-displayed portion of the image to become visible in the screen area, wherein the controller controls the touch display to provide a defined boundary effect between the image and a subsequent image.

36. The apparatus of claim 35, wherein the controller is operable to receive a third user input via the touch display to zoom in or zoom out the respective image displayed in the screen area.

37. The apparatus of claim 35, wherein the controller automatically moves the displayed portion of the resized image without an additional interaction from a user.

38. The apparatus of claim 35, wherein the boundary effect comprises an effect to diffuse a boundary between the image and the subsequent image to make the boundary unclear or blurry.

39. The apparatus of claim 35, wherein the boundary effect comprises an animation effect between the image and the subsequent image.

40. A non-transitory computer readable medium having computer-executable instructions stored thereon, which, when executed by an apparatus having a touch display, causes the apparatus to perform a method comprising:

receiving a first user input, via the touch display, to select a vertical image movement direction among an upward direction and a downward direction for an image and a second user input to select an image movement speed;

if an aspect ratio of the image is different from an aspect ratio of a screen area of the touch display, resizing the image to make a horizontal width thereof a predetermined size that fits within a horizontal width of the screen area, while maintaining the aspect ratio of the image;

automatically moving a displayed portion of the resized image in the selected vertical image movement direction among the upward direction and the downward direction at the selected image movement speed to enable a non-displayed portion of the image to become visible in the screen area; and processing the image and a subsequent image for the touch display to provide a defined boundary effect between the image and the subsequent image.

41. The non-transitory computer readable medium of claim 40, wherein the method further comprises:

receiving a user input via the touch display to zoom in or zoom out a respective image to be displayed in the screen area.

42. The non-transitory computer readable medium of claim 40, wherein the automatically moving is performed without an additional interaction from a user.

43. The non-transitory computer readable medium of claim 40, wherein the boundary effect comprises an effect to diffuse a boundary between the image and the subsequent image to make the boundary unclear or blurry.

44. The non-transitory computer readable medium of claim 40, wherein the boundary effect comprises an animation effect between the image and the subsequent image.

* * * * *